(12) United States Patent
Woo et al.

(10) Patent No.: US 9,531,274 B2
(45) Date of Patent: Dec. 27, 2016

(54) RESONANT CONVERTER, POWER SUPPLY AND POWER CONTROLLING METHOD THEREOF

(71) Applicant: Samsung Electronics Co., Ltd., Suwon-si (KR)

(72) Inventors: Won-myung Woo, Seoul (KR); Jin-hyung Lee, Anyang-si (KR); Gil-yong Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 396 days.

(21) Appl. No.: 14/250,835

(22) Filed: Apr. 11, 2014

(65) Prior Publication Data

US 2014/0369083 A1 Dec. 18, 2014

(30) Foreign Application Priority Data

Jun. 12, 2013 (KR) .................. 10-2013-0066989

(51) Int. Cl.
*H02M 3/335* (2006.01)
*H02M 1/08* (2006.01)
(Continued)

(52) U.S. Cl.
CPC .......... *H02M 3/33507* (2013.01); *H02M 1/08* (2013.01); *H02M 3/3376* (2013.01);
(Continued)

(58) Field of Classification Search
CPC ............. H02M 2007/4815; H02M 2007/4818; H02M 1/083; H02M 3/33507; H02M 3/33538; H02M 3/33546; H02M 3/33553
(Continued)

(56) References Cited

U.S. PATENT DOCUMENTS 8,335,061 B2 * 12/2012 Koo .................. H02M 3/3376
 323/235
2009/0251929 A1 * 10/2009 Choi .................. H02M 1/08
 363/21.02
(Continued)

FOREIGN PATENT DOCUMENTS

KR 10-2012-0070264 A 6/2012
KR 10-2013-0014972 A 2/2013
KR 10-2013-0026714 A 3/2013

OTHER PUBLICATIONS

Communication, Issued by the European Patent Office, Dated Nov. 27, 2014, in counterpart European Application No. 14158169.4.

*Primary Examiner* — Adolf Berhane
*Assistant Examiner* — Afework Demisse
(74) *Attorney, Agent, or Firm* — Sughrue Mion, PLLC

(57) ABSTRACT

A resonant converter, a power supply and a power controlling method thereof are provided. The power supply includes a resonant converter which includes a square wave generator configured to alternately turn on and off first and second switches according to a frequency to generate a square wave, a resonant wave generator configured to generate a resonant wave corresponding to the square wave and a rectifier configured to output a voltage corresponding to the resonant wave; and a controller configured to control a frequency modulation of the resonant converter, wherein the controller includes a variable switching circuit configured to increase the frequency of the resonant converter in response to the resonant converter entering a capacitive mode.

22 Claims, 11 Drawing Sheets

(51) Int. Cl.
  *H02M 3/337* (2006.01)
  *H02M 1/38* (2007.01)
  *H02M 1/00* (2006.01)
(52) U.S. Cl.
  CPC ...... *H02M 1/38* (2013.01); *H02M 2001/0058* (2013.01); *Y02B 70/1433* (2013.01); *Y02B 70/1491* (2013.01)
(58) Field of Classification Search
  USPC .......................................... 363/21.02–21.08
  See application file for complete search history.

(56) References Cited

U.S. PATENT DOCUMENTS

2010/0226050 A1    9/2010  Koo et al.
2014/0368742 A1*  12/2014  Joo .................... H02M 1/4208
                                                      348/730

* cited by examiner

Inductive Mode

Capacitive Mode

RESONANT CONVERTER, POWER SUPPLY AND POWER CONTROLLING METHOD THEREOF

CROSS-REFERENCE TO RELATED APPLICATION

This application claims priority from Korean Patent Application No. 10-2013-0066989, filed on Jun. 12, 2013 in the Korean Intellectual Property Office, the disclosure of which is incorporated herein by reference in its entirety.

BACKGROUND

Field

Apparatuses and methods consistent with exemplary embodiments relate to a resonant converter, a power supply and a power controlling method thereof, and more particularly, to a resonant converter, a power supply and a power controlling method thereof which operates under zero voltage switching (ZVS).

Description of the Related Art

An electronic apparatus including a display apparatus, such as a television (TV) includes a switching mode power supply (SMPS) as a power supply which supplies power necessary for its operation. The SMPS may include, e.g., an LLC resonant converter which supplies power to a main display of a display apparatus.

Efforts made by SMPS to obtain high power density are limited by the size of a passive element. High frequency operation may significantly reduce the size of the passive element, such as a transformer or a filter, but may result in switching loss. To reduce switching loss and ensure the high frequency operation, a resonant switching technology has emerged.

FIG. 1 illustrates an LLC resonant converter of the related art.

As shown in FIG. 1, the LLC resonant converter includes a square wave generator 11, a resonant part 13 and a rectifier 15.

The square wave generator 11 operates by a control pulse frequency modulation (PFM) integrated circuit (IC) which changes a frequency depending on a load state, and may be implemented as a half-bridge or a full bridge type.

FIG. 2 illustrates an example of the square wave generator 11 of the LLC resonant converter which is implemented as a half-bridge type. FIG. 3 illustrates an operating waveform of the LLC resonant converter in FIG. 2.

Switches Q1 and Q2 of the square wave generator 11 are alternately turned on and off at a duty ratio of 50% depending on the frequency that changes according to load. The switches Q1 and Q2 have a small dead time during their alternate operation, as in FIG. 3, and perform continuous operations without arm short. The resonant part 13 includes a capacitor $C_r$, a leakage inductance $L_r$ and a magnetizing inductance $L_m$ of a transformer.

The rectifier 15 rectifies an alternating current (AC) with a rectifying diode and a capacitor to generate a direct current (DC) voltage. The rectifier 15 may be formed by a combination of a full-bridge diode or a center-tap and a capacitor.

Referring to FIG. 3, an operating frequency of a waveform is a resonant frequency decided by a resonance between the leakage inductance $L_r$ and the capacitor $C_r$. Since the magnetizing inductance $L_m$ is relatively small, there is a considerable amount of the magnetizing current $I_m$, which circulates a primary coil of the transformer regardless of power transmission. A current $I_p$ of the primary coil is the sum of the magnetizing current $I_m$ and a secondary current, which is referred to by the primary coil.

The current $I_p$ is delayed with respect to a voltage $V_d$ which is applied to the resonant part 13, and accordingly, when the MOSFET, i.e., switches Q1 and Q2 are turned on, they achieve a zero voltage switching (ZVS). That is, when a voltage of the opposite ends of the MOSFET becomes a zero potential by a current flowing through an internal diode, the switches Q1 and Q2 are turned on.

FIGS. 4 and 5 illustrate changes in waveforms depending on a normal (inductive) mode and an overload (capacitive) mode of the LLC resonant converter in FIG. 2.

An input impedance of a resonant terminal is inductive under normal operation conditions. As shown in FIG. 4, the input current $I_p$ of the resonant terminal is delayed with respect to the voltage $V_d$ applied to the resonant terminal. This means that the MOSFET Q1 and Q2 operate under soft switching, i.e., under ZVS under which the MOSFET Q1 and Q2 are turned on at a zero voltage as in FIG. 4.

Under serious overload conditions, the input impedance of the resonant terminal is capacitive, and the input current $I_p$ passes the voltage $V_d$ as shown in FIG. 5. If the resonant converter operates in a capacitive mode, the MOSFET Q1 and Q2 do not achieve the ZVS and thus a high switching loss occurs due to a hard switching of the MOSFET Q1 and Q2. As a body diode of the MOSFET is reversely recovered during a switching conversion, a spike current and serious noise may occur. Accordingly, if the resonant converter operates in the capacitive mode, the MOSFET may be easily damaged for the aforementioned reason.

Generally, the LLC resonant converter minimizes switching loss and maximizes its efficiency through ZVS operation. However, when the LLC resonant converter operates under overload conditions, i.e., operates in the capacitive mode, the operating frequency is minimized and a circuit suffers a hard fail. Therefore, there is a need to prevent the LLC resonant converter from operating in the capacitive mode and to control the LLC resonant converter to perform a stable ZVS operation, to thereby ensure circuit stability.

SUMMARY

According to an aspect of an exemplary embodiment, there is provided a power supply including: a resonant converter which includes a square wave generator configured to alternately turn on and off first and second switches according to a frequency to generate a square wave, a resonant wave generator configured to generate a resonant wave corresponding to the square wave and a rectifier configured to output a voltage corresponding to the resonant wave; and a controller configured to control a frequency modulation of the resonant converter, wherein the controller includes a variable switching circuit configured to increase the frequency of the resonant converter in response to the resonant converter entering a capacitive mode.

The variable switching circuit may include a logic AND gate configured to receive an input current of the first switch and a gate voltage of the second switch, and a counter logic circuit configured to output a high signal corresponding to the capacitive mode, according to an output of the logic AND gate.

The counter logic circuit may be configured to count a number of high outputs from the logic AND gate, and in response to the counted number reaching a preset number, the logic circuit may output the high signal.

The AND gate may be configured to output a high signal corresponding to a section where a reverse recovery current is generated from the first switch.

The input current of the first switch may be input to the logic AND gate as a half wave signal from which a minus section has been removed.

The controller may further include an oscillator configured to increase the frequency of the resonant converter in response to the counter logic circuit outputting a high signal.

The resonant converter may be changed into an inductive mode according to the increased frequency, and the first and second switches may be configured to perform a zero voltage switching (ZVS) operation.

The controller may further include a dead time generator configured to generate a dead time in response to the first and second switches being alternately turned on and off.

According to an aspect of another exemplary embodiment, there is provided a power controlling method of a power supply, the power controlling method including: detecting that a resonant converter, which includes a square wave generator configured to alternately turn on and off first and second switches according to a variable frequency to generate a square wave, a resonant wave generator configured to generate a resonant wave corresponding to the square wave and a rectifier configured to output a voltage corresponding to the resonant wave, enters a capacitive mode; and increases a frequency of the resonant converter in response to the detecting the resonant converter enters the capacitive mode.

The detecting that the resonant converter enters the capacitive mode may include receiving an input current of the first switch and a gate voltage of the second switch; performing AND calculation of the input current of the first switch and the gate voltage of the second switch; and outputting a high signal corresponding to the capacitive mode according to the calculation result.

The performing the AND calculation may include outputting a high signal corresponding to a section where a reverse recovery current is generated from the first switch.

The outputting the high signal may include counting a number of a high output when the AND calculation is performed; and outputting the high signal in response to the counted number reaching a preset number.

The input current of the first switch may be input to the logic AND gate as a half wave signal, from which a minus section has been removed.

The increasing the frequency may include increasing the frequency of the resonant converter in response to the high signal being output.

The resonant converter may be configured to be changed into an inductive mode according to the increased frequency, and the first and second switches may be configured to perform a ZVS operation.

The power controlling method may further include generating a dead time in response to the first and second switches being alternately turned on and off.

According to an aspect of another exemplary embodiment, there is provided a resonant converter including: a square wave generator configured to alternately turn on and off first and second switches according to a frequency to generate a square wave; a resonant wave generator configured to generate a resonant wave corresponding to the square wave; a rectifier configured to output a voltage corresponding to the resonant wave; and a controller configured to control a frequency modulation of the resonant converter, wherein the controller includes a variable switching circuit configured to increase the frequency of the resonant converter in response to the resonant converter entering a capacitive mode.

The variable switching circuit may include a logic AND gate which receives an input current of the first switch and a gate voltage of the second switch, and a counter logic circuit which outputs a high signal corresponding to the capacitive mode according to an AND calculation result of the logic AND gate.

The counter logic circuit may be configured to count a number of high outputs from the logic AND gate, and in response to the counted number reaching a preset number, output the high signal.

The AND gate may be configured to output a high signal which corresponds to a section where a reverse recovery current is generated from the first switch.

The input current of the first switch may be input to the logic AND gate as a half wave signal from which a minus section has been removed.

The controller may be further configured to include an oscillator which increases the frequency of the resonant converter in response to the counter logic circuit outputting a high signal.

The resonant converter may be configured to be changed into an inductive mode according to the increased frequency, and the first and second switches may perform a ZVS operation.

The controller may further include a dead time generator which generates a dead time in response to the first and second switches being alternately turned on and off.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
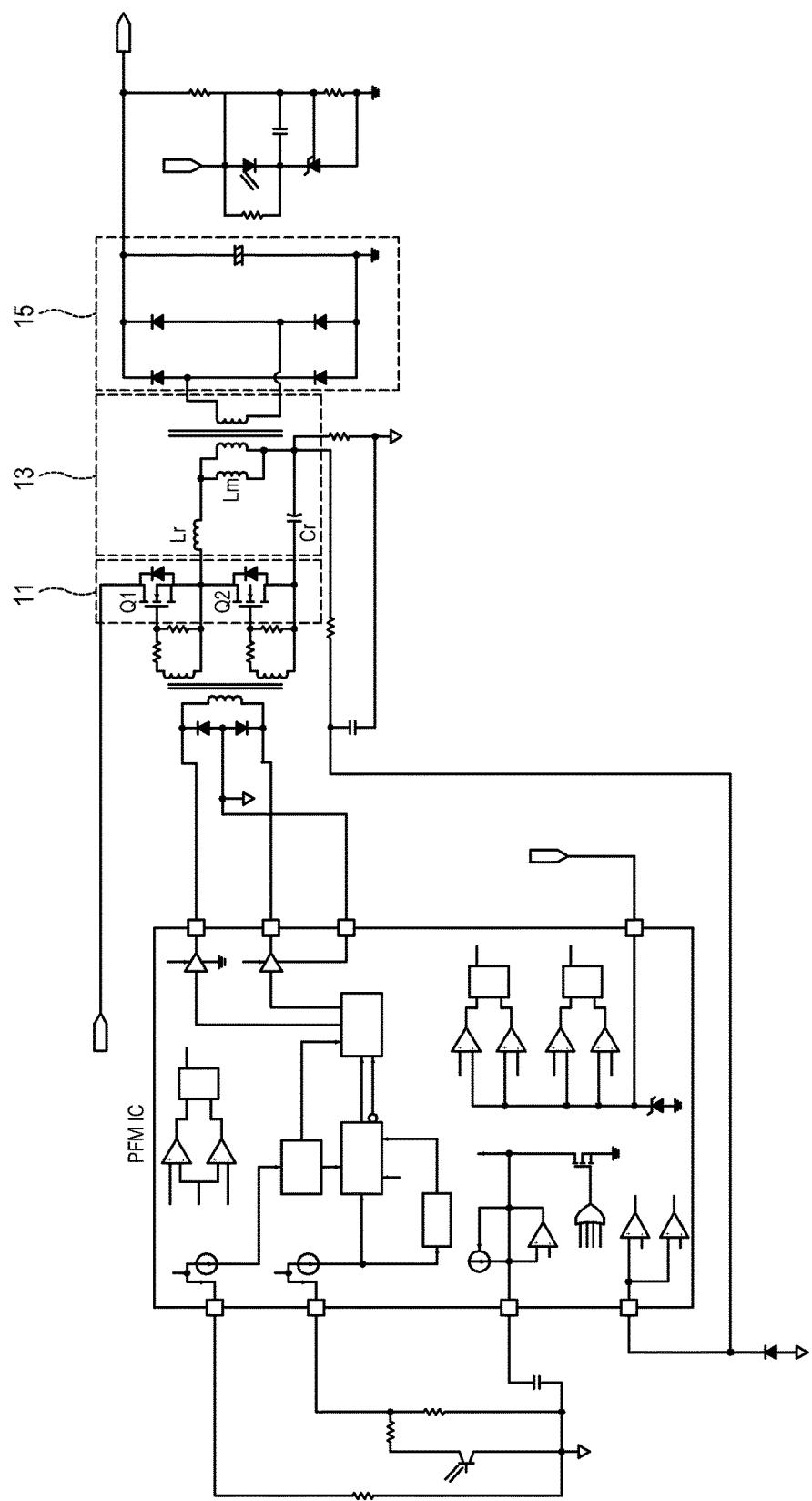
FIG. 1 illustrates a related art LLC resonant converter.
Figure 2:
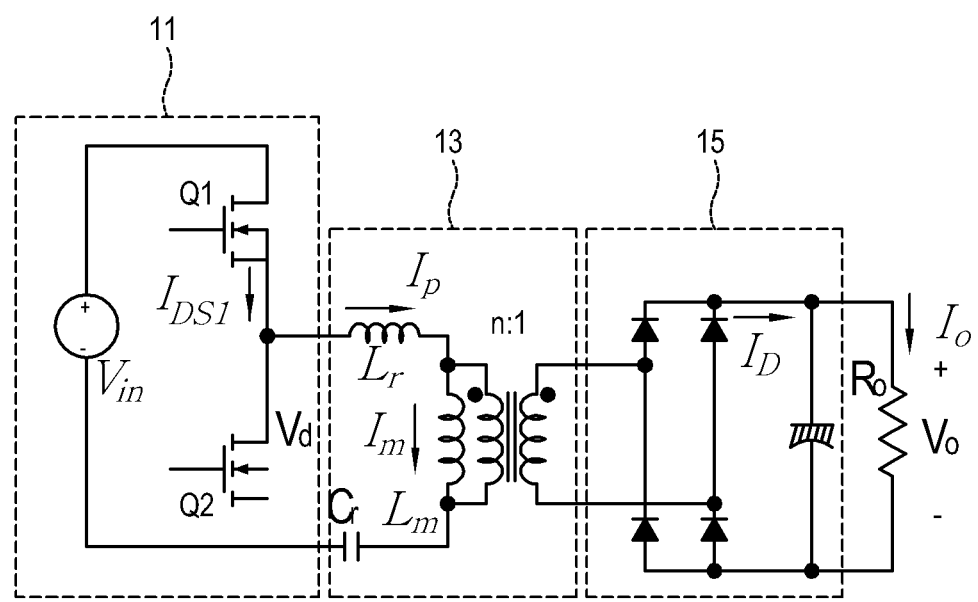
FIG. 2 illustrates a square wave generator of the LLC resonant converter in FIG. 1 which is implemented as a half-bridge type.
Figure 3:
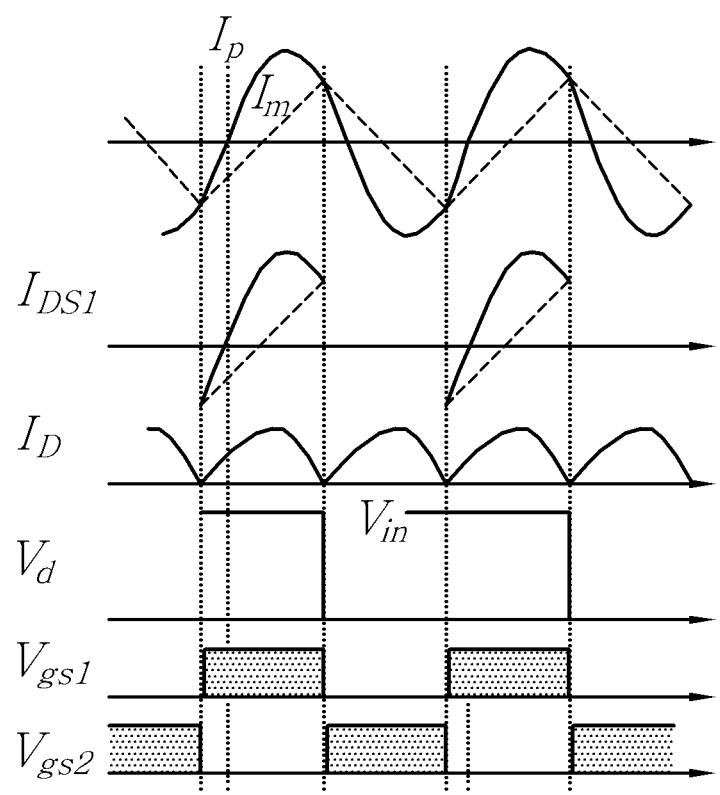
FIG. 3 illustrates an operating waveform of the LLC resonant converter in FIG. 2.

Below, exemplary embodiments will be described in detail with reference to accompanying drawings so as to be easily understood by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 6:
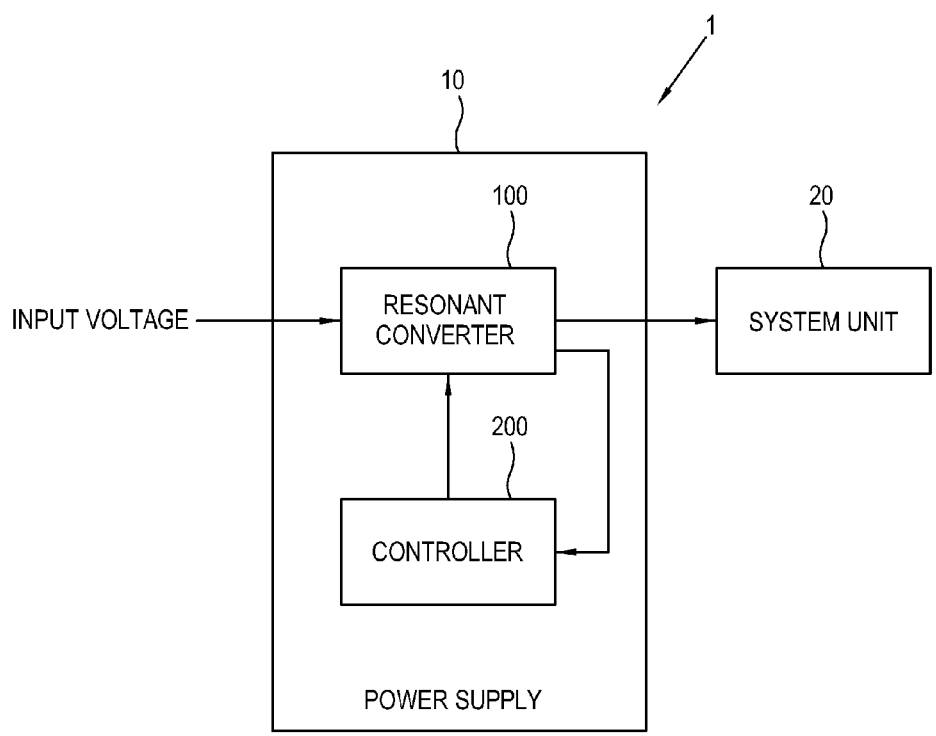
FIG. 6 is a block diagram of an electronic apparatus according to an exemplary embodiment.

FIG. 6 is a block diagram of an electronic apparatus 1 according to an exemplary embodiment.

The electronic apparatus 1 may be implemented as a display apparatus such as a television (TV) or a monitor, or a portable device such as an MP3 player or a mobile phone, or a computer such as a desktop computer or a laptop computer. As shown in FIG. 6, the electronic apparatus 1 may include a power supply 10 to supply power to a system unit 20, as a load, for performing operations.

The system unit 20 performs operations of the electronic apparatus 1. For example, if the electronic apparatus 1 is a display apparatus, the system unit 20 may include an image processor which processes an image signal supplied by an external image supply source, according to a preset image processing operation in order to display an image, a display which displays an image thereon based on the processed image signal, a communication interface which communicates with the outside, a storage which stores various data therein, and a controller (central processing unit (CPU)) which controls the display apparatus.

Figure 7:
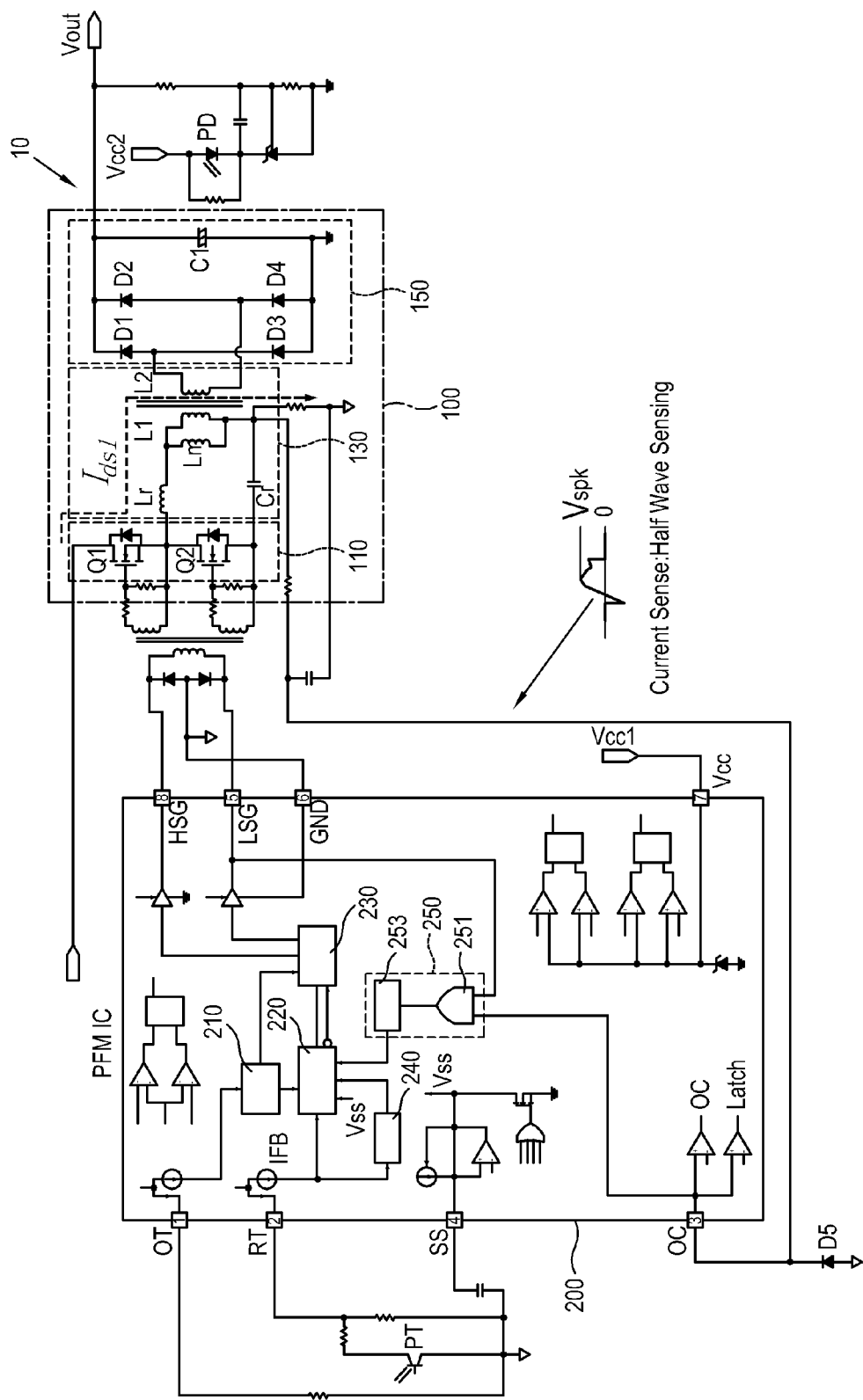
FIG. 7 is a circuit diagram of a power supply according to the exemplary embodiment.

In an exemplary embodiment, the system unit 20 includes, e.g., a display apparatus displaying an image thereon, and FIG. 7 illustrates the load 20 which is implemented as a plasma display panel (PDP). However, the display type according to an exemplary embodiment is not limited to the foregoing, and may further include liquid crystal display (LCD), a plasma display panel (PDP), light emitting diode (LED), surface-conduction electron-emitter, carbon nano-tube, nano-crystal, etc.

The power supply 10 is implemented as a switching mode power supply (SMPS), and supplies operating power to the system unit 20, and includes a resonant converter 100 which supplies main power to a display. The resonant converter 100 outputs an operating voltage, which is generated by changing a level of a DC input voltage, as operating power of the system unit 20. The power supply 10 may further include a flyback converter and a power factor corrector (PFC) converter to supply operating power to the system unit 20 even though they are not shown in FIG. 6.

The controller 200 receives a signal from the resonant converter 100 regarding an operational mode, and controls a frequency modulation of the resonant converter 100 according to a load state. The controller 200 may be implemented as a pulse frequency modulation (PFM) integrated circuit (IC) which performs a PFM.

Figure 8:
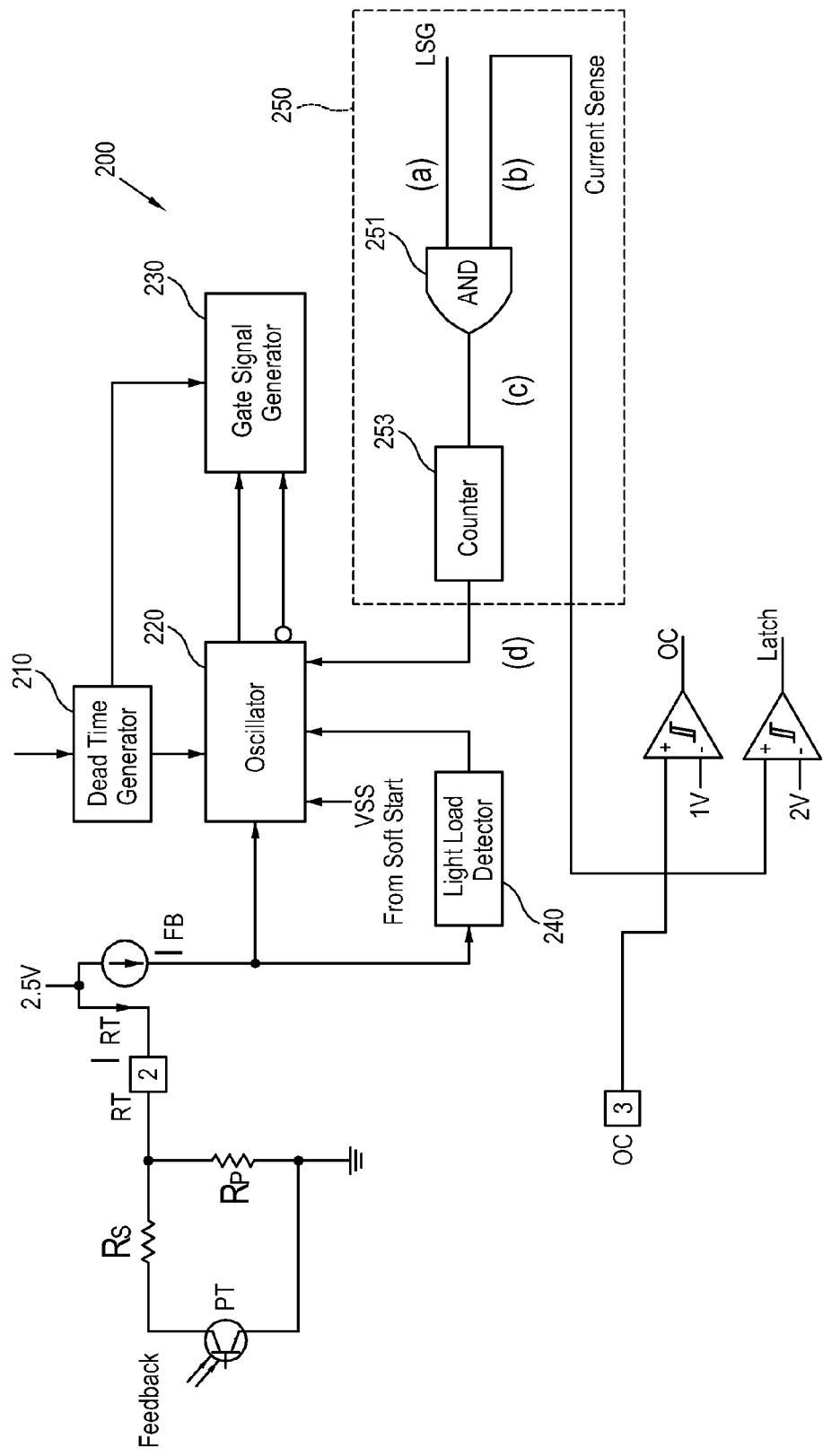
FIG. 8 is a circuit diagram of a controller which controls a modulation frequency of a resonant converter in FIG. 7.

In the exemplary embodiment in FIGS. 6, 7 and 8, the controller 200 is separately provided from the resonant converter 100 but the present embodiment is not limited thereto. Alternatively, the controller 200 may be included in the resonant converter 100, e.g., may be included as a part of the square wave generator 110.

Figure 9:
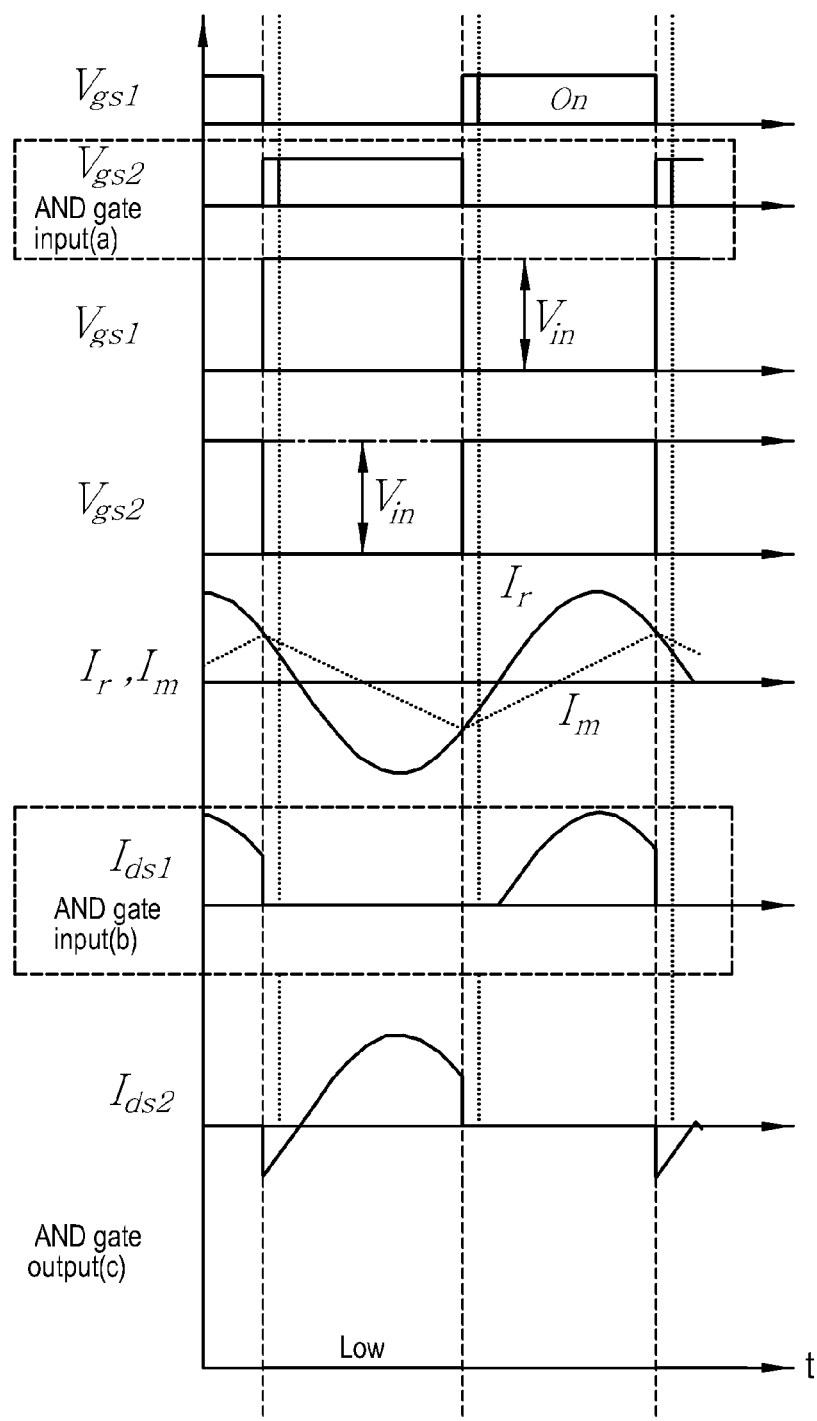
FIGS. 9 and 10 illustrate changes in waveforms depending on operations of the resonant converter in FIGS. 7 and 8 in a normal mode and an overload mode.
Figure 10:
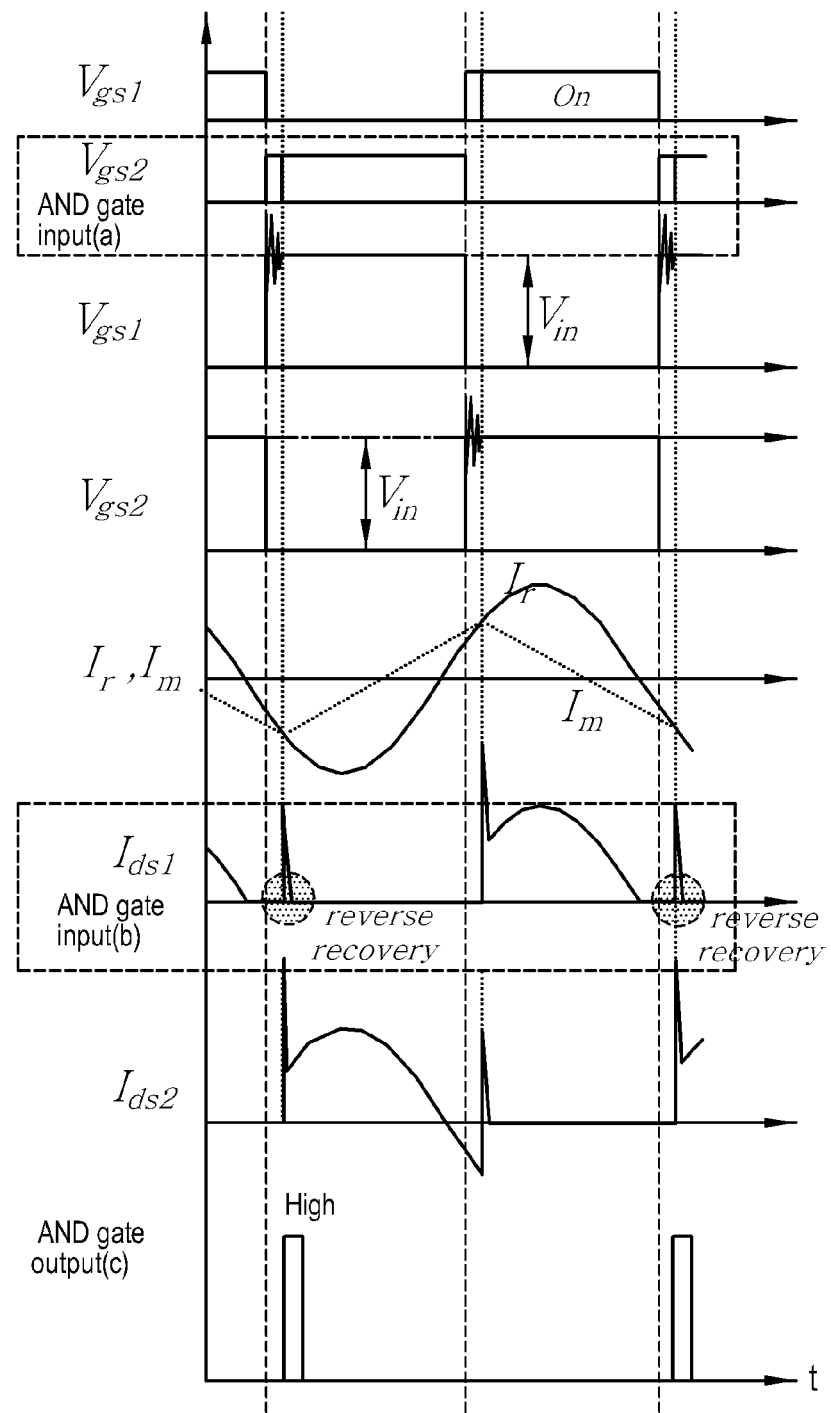

FIG. 7 is a circuit diagram of the power supply 10 according to an exemplary embodiment. FIG. 8 is a circuit diagram of the controller 200 which controls a frequency modulation of the resonant converter 100 in FIG. 7. FIGS. 9 and 10 illustrate changes in waveforms depending on a normal mode and an overload mode of the resonant converter 100 in FIGS. 7 and 8.

The resonant converter 100 according to an exemplary embodiment is implemented as an LLC resonant converter or an LC resonant converter, receives an input voltage $V_{in}$ and outputs an output voltage $V_{out}$, which is generated by changing a level of the input voltage $V_{in}$, as operating power of the system unit 20.

As shown in FIG. 7, the resonant converter 100 includes a square wave generator 110, a resonant wave generator 130 and a rectifier 150.

The square wave generator 110 may be implemented as a half-bridge or a full-bridge type, and first and second switches Q1 and Q2 of the square wave generator 110 are alternately turned on and off at a duty ratio of 50%, based on a frequency that is changed by control of controller 200. The square wave generator 110 generates a square wave corresponding to the turn-on and turn-off of the first and second switches Q1 and Q2. The first and second switches Q1 and Q2 have a small dead time (e.g., hundreds of nanoseconds) during their alternate operation, and perform continuous operations without arm short by not being turned on at the same time. The dead time refers to the time during which the switches Q1 and Q2 remain in the off-state, and may be controlled by a dead time generator 210 of the controller 200.

The resonant wave generator 130 generates a resonant wave which corresponds to the square wave generated by the square wave generator 110, and includes a capacitor $C_r$, a leakage inductance $L_r$, transformers L1 and L2 and a magnetizing inductance $L_m$. The resonant wave generator 130 operates by a resonant frequency that is decided by a resonance between the leakage inductance $L_r$ and the capacitor $C_r$, and transmits to the rectifier 150 through the transformers L1 and L2 a part of a resonant current generated by resonating with the square wave generated by the square wave generator 110. The magnetizing inductance $L_m$ operates as a shunt inductor which provides a current path for a current generated by excluding the current induced to a secondary coil L2 of the transformer through a primary coil L1 of the transformer from the current $I_p$ flowing to the leakage inductance $L_r$ ($I_p-I_{L1}=I_m$) to flow to the capacitor $C_r$. That is, the inductor $L_m$ maintains a voltage gain of the resonant converter 100 at a consistent level even upon change in a load of an output terminal, and controls the output voltage $V_{out}$ at an almost consistent frequency regardless of the load change.

A first end of the inductor $L_r$ is connected to a first end of the first switch Q1, and a first end of the primary coil of the transformer is connected to a second end of the inductor $L_r$. A first end of the capacitor $C_r$ is connected to a second end of the primary coil L1 of the transformer, and a second end of the capacitor $C_r$ is connected to a contact point between the first switch Q1 and the second switch Q2. The inductor $L_m$ is formed in opposite ends of the primary coil L1 of the transformer as a current flow through the primary coil L1 of the transformer.

The rectifier 150 includes rectifying diodes D1, D2, D3 and D4, and a capacitor C1, and rectifies an AC current applied to the secondary coil of the transformer of the resonant wave generator 130 and generates a DC voltage therefrom. The generated DC voltage is supplied as operating power to the system unit 20. The structure of the rectifier 150 is not limited to that in FIG. 7, and may vary including a combination of a full-bridge diode or a center-tap and a capacitor.

As shown in FIGS. 7 and 8, the controller 200 according to an exemplary embodiment includes a dead time generator 210, an oscillator 220, a gate signal generator 230, a light load detector 240 and a variable switching circuit 250.

The dead time generator 210 generates a dead time during the alternate operation of the first and second switches Q1 and Q2 of the square wave generator 110 so that the first and second switches Q1 and Q2 perform the ZVS.

The oscillator 220 controls a frequency modulation of the resonant converter 100 to alternately turn on and off the first and second switches Q1 and Q2. The oscillator 220 according to an exemplary embodiment modulates the pulse frequency of the first and second switches Q1 and Q2 to consistently maintain the voltage output to the load through the resonant converter 100. The controller 200 has preset maximum and minimum frequencies, and the maximum frequency may be set as, e.g., 350 kHz. The oscillator 220 according to an exemplary embodiment receives power from the load of the resonant converter 100 through an RT terminal 2, an OC terminal 3 and an SS terminal 4 as in FIG. 7. For example, a phototransistor PT connected to the SS terminal 4 is driven by the current from the load through a photodiode PD, and the current is provided as a voltage $V_{ss}$ to the oscillator 220.

The gate signal generator 230 receives a control signal from the dead time generator 210 and the oscillator 220 to generate a gate signal as an output signal of the controller 200. The generated gate signal is supplied to the resonant converter 100 to control the frequency modulation.

The light load detector 240 receives a feedback current $I_{FB}$ generated from a feedback signal supplied by the load through the RT terminal 2, and transmits a load detection signal to the oscillator 220.

The controller 200 of the power supply 10 according to an exemplary embodiment further includes the variable switching circuit 250 which changes, i.e., increases, the operating frequency of the resonant converter 100 in response to detecting that the resonant converter 100 enters a capacitive mode.

As shown in FIGS. 7 and 8, the variable switching circuit 250 includes a logic AND gate 251 which performs AND calculation of an input current $I_{ds1}$ of the first switch Q1 as a high side switch and a gate voltage $V_{gs2}$ of the second switch Q2 as a low side switch and outputs the calculation result; and a counter logic circuit 253 which counts the number of high outputs of the logic AND gate 251 and outputs a high or low signal.

The input current $I_{ds1}$ of the first switch Q1 is supplied back to the logic AND gate 251 through the OC terminal 3 of the controller 200 as in FIG. 7. The input current $I_{ds1}$ of the logic AND gate 251 may be sensed as a half wave signal generated by removing a minus section from the current supplied back to the OC terminal 3 through the diode D5, as in an AND gate input (b) in FIGS. 9 and 10. The gate voltage $V_{gs2}$ of the second switch Q2 which is input to the logic AND gate 251 is input corresponding to the turn-on section of the second switch Q2 as in an AND gate input (a) in FIGS. 9 and 10 according to the turn-on or turn-off of the first and second switches Q1 and Q2.

FIGS. 7 to 10 illustrate the case where the logic AND gate 251 receives the input current $I_{ds1}$ of the first switch Q1 and the gate voltage $V_{gs2}$ of the second switch Q2, but an exemplary embodiment also includes the case where the logic AND gate 251 receives an input current of one of the switches Q1 and Q2 of the LC resonant converter 100 and a gate voltage of the other one of the switches Q1 and Q2 of the LC resonant converter 100. That is, the logic AND gate 251 may receive an input current $I_{ds2}$ of the second switch Q2 and a gate voltage $V_{gs1}$ of the second switch Q1.

The counter logic circuit 253 counts the number of a high output of the logic AND gate 251, and in response to the counted number reaching a preset number (e.g. twice), decides that its final output is high, and outputs a high signal.

In response to the counted number being below the preset number, the counter logic circuit 253 maintains its output as a low state.

In an exemplary embodiment, the counter logic circuit 253 outputs the high signal in response to counting two high outputs from the logic AND gate 251 by taking into account a temporary malfunction, but is not limited thereto. Alternatively, the counter logic circuit 253 may count three, four or five times or more of the high outputs from the logic AND gate 251.

The output of the counter logic circuit 253 is transmitted to the oscillator 220, which changes, i.e., increases the operating frequency of the resonant converter 100 upon receiving the high output of the counter logic circuit 253.

Hereinafter, operations of the variable switching circuit 250 which are performed in an inductive mode and a capacitive mode will be described in more detail, with reference to FIGS. 9 and 10.

Figure 4:
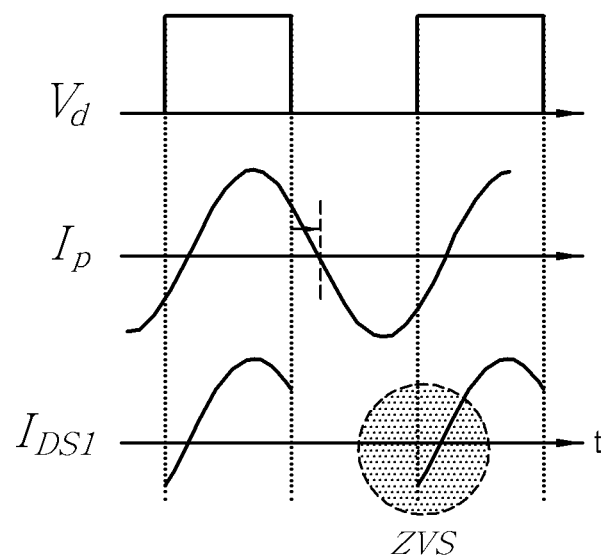
FIGS. 4 and 5 illustrate changes in waveforms, depending on operations of the LLC resonant converter in FIG. 2 in an normal mode and an overload mode.
Figure 5:
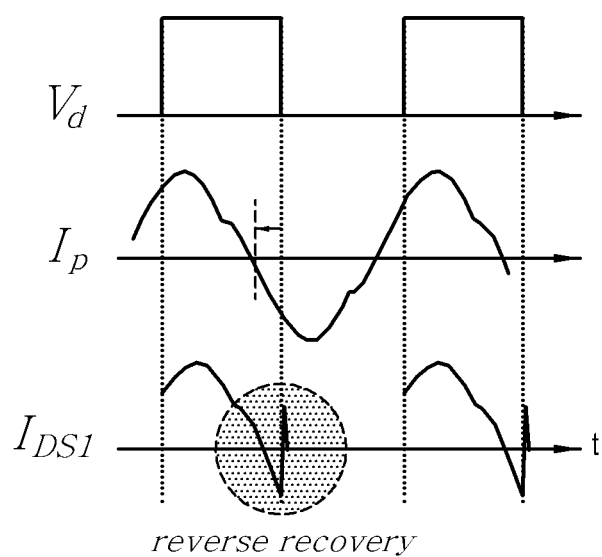

As shown in FIG. 9, a current $I_r$ is delayed with respect to a voltage $V_{ds2}$ by a magnetizing current $I_m$ like in the case in FIG. 4. Accordingly, there is no section in which the input voltage $V_{gs2}$ (AND gate input (a)) and the input current $I_{ds1}$ (AND gate input (b)) of the logic AND gate 251 are turned on simultaneously, and the AND gate output (c) of the logic AND gate 251 becomes low. The output of the counter logic circuit 253 is also maintained as the low state, and the variable switching circuit 250 operates under soft switching under which it is turned on at a zero voltage, i.e., operates in a normal ZVS section.

In the capacitive mode, the current $I_r$ passes the voltage $V_{ds2}$ as shown in FIG. 10, and this generates a reverse recovery current in a body diode of the MOSFET Q1 between the gate signal $V_{gs2}$ of the switch Q2 in the input (a) of the logic AND gate 251 of the variable switching circuit 250 and the current sensing value of the switch Q1 in the input (b) thereof. Due to a hard switching of the resonant converter 100, there is no ZVS and a huge switching loss occurs.

In the section where the reverse recovery current is generated, the input voltage $V_{gs2}$ of the AND gate input (a) of the logic AND gate 251 and the input current $I_{ds1}$ of the AND gate input (b) thereof are simultaneously turned on and the AND gate output (c) of the logic AND gate 251 outputs a high signal.

The counter logic circuit 253 counts the number of a high signal of the output signal (c) of the logic AND gate 251, and in response to the counted number reaching a preset number (e.g. twice), outputs a high signal as a logic output (c) thereof.

The high signal which is output by the counter logic circuit 253 is input to the oscillator 220 of the controller 200, and thus a frequency gradually increases by the operation of the oscillator 220 which determines the frequency of the gate signal of the resonant converter 100. The resonant converter 100 which operates in the capacitive mode by continuously receiving signals according to the increased frequency is changed into the inductive mode, and the variable switching circuit 250 enters the normal ZVS operation section.

Hereinafter, a PFM control process of the power supply 10 according to an exemplary embodiment will be described with reference to FIG. 11.

Figure 11:
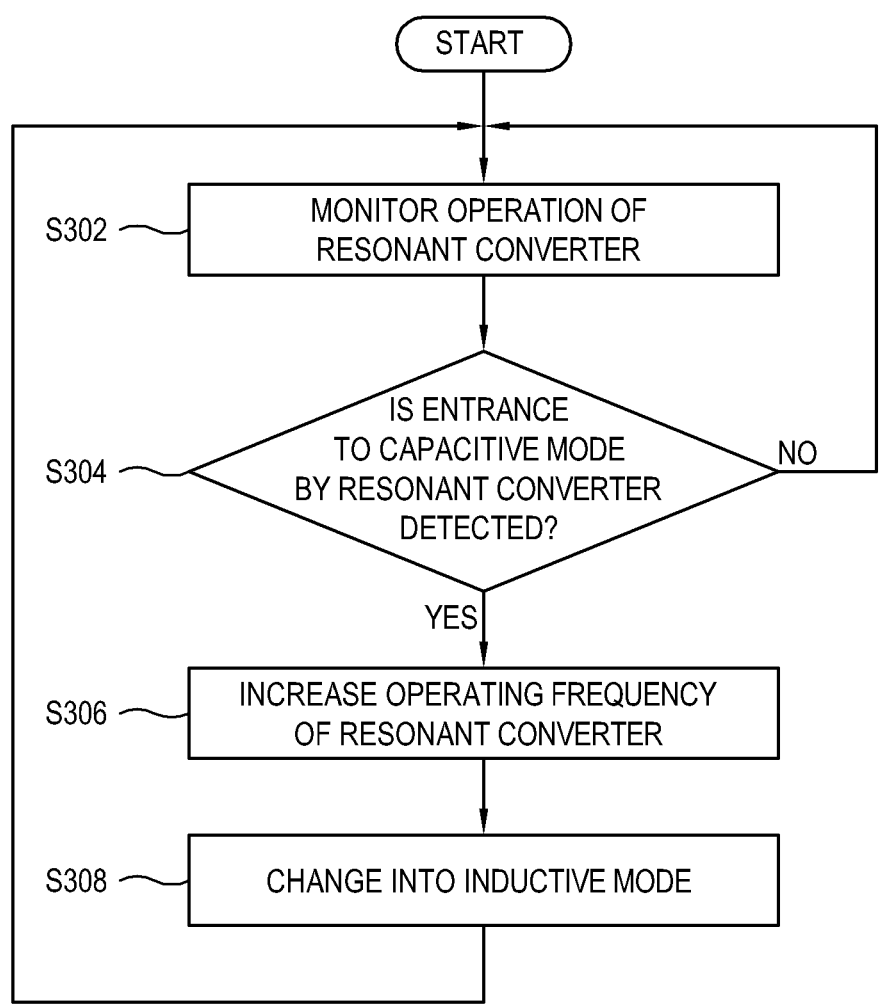
FIG. 11 is a flowchart showing a power controlling method of the power supply according to an exemplary embodiment.

FIG. 11 is a flowchart showing a power controlling method of the power supply 10, according to an exemplary embodiment.

As shown therein, the controller 200 of the power supply 10 of the electronic apparatus 1 according to an exemplary embodiment monitors the operation of the resonant converter 100 (S302). The controller 200 may monitor whether the resonant converter 100 enters the capacitive mode by using the current $I_{ds1}$ and the voltage $V_{gs2}$ input to the logic AND gate 251 of the variable switching circuit 250.

According to the monitoring result obtained at operation S302, the controller 200 may detect whether the resonant converter 100 enters the capacitive mode (S304). More specifically, in response to their being a high output section of the logic AND gate 251, and the number of the high output counted by the counter logic circuit 253 reaches the preset number, the counter logic circuit 253 outputs the high signal as the logic signal and the entrance to the capacitive mode by the resonant converter 100 is detected.

In response to the entrance to the capacitive mode by the resonant converter 100 being detected at operation S304, the operating frequency of the resonant converter 100 is changed, i.e., increases according to a control of the oscillator 220 (S306). The controller 200 may control the frequency modulation by continuously receiving and monitoring the current $I_{ds1}$ and voltage $V_{gs2}$ which are changed according to the increased frequency.

In response to the operating frequency increasing at operation S306, the resonant converter 100 is changed into the inductive mode (S308). The controller 200 may increase the operating frequency until the entrance to the inductive mode by the resonant converter 100 is detected. The controller 200 continuously monitors the operation of the resonant converter 100 even after the resonant converter 100 is changed into the inductive mode, and performs the PFM which is performed at operations S304 to S306, according to the result of the monitoring.

According to the exemplary embodiments, in response to detecting that the LLC resonant converter 100 enters the capacitive mode as the overload condition, the power supply 10 increases the operating frequency so that the LLC resonant converter 100 is changed into the inductive mode and performs the ZVS operation to thereby improve switching efficiency and ensure circuit stability.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A power supply comprising:
a resonant converter which comprises a square wave generator configured to alternately turn on and off first and second switches according to a frequency to generate a square wave, a resonant wave generator configured to generate a resonant wave corresponding to the square wave and a rectifier configured to output a voltage corresponding to the resonant wave; and
a controller configured to control a frequency modulation of the resonant converter, wherein the controller comprises a variable switching circuit configured to increase the frequency of the resonant converter in response to the resonant converter entering a capacitive mode,
wherein the variable switching circuit comprises a logic AND gate configured to receive an input current of the first switch and a gate voltage of the second switch, and a counter logic circuit configured to count a number of high outputs from the logic AND gate and, in response to the counted number reaching a preset number, output a high signal corresponding to the capacitive mode, and
wherein the controller is further configured to increase the frequency of the resonant converter in response to the counter logic circuit outputting the high signal.

2. The power supply according to claim 1, wherein the AND gate is configured to provide a high output corresponding to a section where a reverse recovery current is generated from the first switch.

3. The power supply according to claim 1, wherein the input current of the first switch is input to the logic AND gate as a half wave signal from which a minus section has been removed.

4. The power supply according to claim 1, wherein the controller further comprises an oscillator configured to increase the frequency of the resonant converter in response to the counter logic circuit outputting the high signal.

5. The power supply according to claim 1, wherein the resonant converter is changed into an inductive mode according to the increased frequency, and the first and second switches are configured to perform a zero voltage switching (ZVS) operation.

6. The power supply according to claim 1, wherein the controller further comprises a dead time generator configured to generate a dead time in response to the first and second switches being alternately turned on and off.

7. The power supply according to claim 1, wherein the gate voltage of the second switch which is input to the logic AND gate is input corresponding to a turn on section of the second switch.

8. A power controlling method of a power supply, the power controlling method comprising:
detecting that a resonant converter, which comprises a square wave generator configured to alternately turn on and off first and second switches according to a frequency to generate a square wave, a resonant wave generator configured to generate a resonant wave corresponding to the square wave and a rectifier to output a voltage corresponding to the resonant wave, enters a capacitive mode; and
increasing the frequency of the resonant converter in response to the detecting that the resonant converter enters the capacitive mode,
wherein the detecting that the resonant converter enters the capacitive mode comprises:
receiving an input current of the first switch and a gate voltage of the second switch:
performing an AND calculation of the input current of the first switch and the gate voltage of the second switch;
counting a number of high outputs obtained from the AND calculation; and
outputting a high signal corresponding to the capacitive mode in response to the counted number reaching a preset number.

9. The power controlling method according to claim 8, wherein the performing the AND calculation comprises outputting a high signal which corresponds to a section where a reverse recovery current is generated from the first switch.

10. The power controlling method according to claim 8, wherein the input current of the first switch is input to the logic AND gate as a half wave signal from which a minus section has been removed.

11. The power controlling method according to claim 8, wherein the increasing the frequency comprises increasing the frequency of the resonant converter if in response to the high signal being output.

12. The power controlling method according to claim 8, wherein the resonant converter is changed into an inductive mode according to the increased frequency, and the first and second switches perform a ZVS operation.

13. The power controlling method according to claim 8, further comprising generating a dead time in response to the first and second switches being alternately turned on and off.

14. The power controlling method according to claim 8, wherein the gate voltage of the second switch which is input to the logic AND gate is input corresponding to a turn on section of the second switch.

15. A resonant converter comprising:
a square wave generator configured to alternately turn on and off first and second switches according to a frequency to generate a square wave;
a resonant wave generator configured to generate a resonant wave corresponding to the square wave;
a rectifier configured to output a voltage corresponding to the resonant wave; and
a controller configured to control a frequency modulation of the resonant converter, wherein the controller comprises a variable switching circuit configured to increase the frequency of the resonant converter in response to the resonant converter entering a capacitive mode,
wherein the variable switching circuit comprises a logic AND gate configured to receive an input current of the first switch and a gate voltage of the second switch, and a counter logic circuit configured to count a number of high outputs from the logic AND gate and, in response to the counted number reaching a preset number, output a high signal corresponding to the capacitive mode, and
wherein the controller is further configured to increase the frequency of the resonant converter in response to the counter logic circuit outputting the high signal.

16. The resonant converter according to claim 15, wherein the AND gate is configured to output a high signal which corresponds to a section where a reverse recovery current is generated from the first switch.

17. The resonant converter according to claim 15, wherein the input current of the first switch is input to the logic AND gate as a half wave signal from which a minus section has been removed.

18. The resonant converter according to claim 15, wherein the controller further comprises an oscillator configured to increase the frequency of the resonant converter in response to the counter logic circuit outputting a high signal.

19. The resonant converter according to claim 15, wherein the resonant converter is configured to change to an inductive mode according to the increased frequency, and the first and second switches are configured to perform a ZVS operation.

20. The resonant converter according to claim 15, wherein the controller further comprises a dead time generator configured to generate a dead time in response to the first and second switches being alternately turned on and off.

21. The resonant converter according to claim 15, wherein the gate voltage of the second switch which is input to the logic AND gate is input corresponding to a turn on section of the second switch.

22. A power supply for compensating for system overload by increasing the frequency of a resonant converter, the power supply comprising:
a resonant converter comprising:
a controller configured to control a frequency modulation of the resonant converter, the controller being configured to increase a frequency of the resonant converter in response to the resonant converter entering a capacitive mode,
wherein under normal operation, the power supply operates in an inductive mode under zero voltage switching, and during overload the power supply operates in the capacitive mode, and
wherein, upon the power supply operating in a capacitive mode, the controller is configured to increase the frequency of the resonant converter in order to place the resonant converter into inductive mode, and
wherein the controller includes a variable switching circuit configured to increase the frequency of the resonant converter, the variable switching circuit comprising a logic AND gate configured to receive an input current of the first switch and a gate voltage of the second switch, and a counter logic circuit configured to count a number of high outputs from the logic AND gate and, in response to the counted number reaching a preset number, output a high signal corresponding to the capacitive mode, and
wherein the controller is further configured to increase the frequency of the resonant converter in response to the counter logic circuit outputting the high signal.

* * * * *